(12) United States Patent
Shibayama

(10) Patent No.: US 8,045,158 B2
(45) Date of Patent: Oct. 25, 2011

(54) SPECTROMETER

(75) Inventor: Katsumi Shibayama, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 12/377,358

(22) PCT Filed: Jun. 9, 2008

(86) PCT No.: PCT/JP2008/060548
§ 371 (c)(1),
(2), (4) Date: Feb. 12, 2009

(87) PCT Pub. No.: WO2009/110109
PCT Pub. Date: Sep. 11, 2009

(65) Prior Publication Data
US 2010/0315634 A1    Dec. 16, 2010

(30) Foreign Application Priority Data
Mar. 4, 2008 (JP) ................. P2008-053720

(51) Int. Cl.
*G01J 3/18* (2006.01)
(52) U.S. Cl. ........................ 356/328; 356/326
(58) Field of Classification Search .............. 356/326, 356/328
See application file for complete search history.

(56) References Cited

U.S. PATENT DOCUMENTS

| 6,181,418 B1* | 1/2001 | Palumbo et al. ............. 356/328 |
| 7,081,955 B2* | 7/2006 | Teichmann et al. ........... 356/328 |
| 7,369,228 B2* | 5/2008 | Kerstan et al. ............... 356/328 |
| 2009/0135420 A1* | 5/2009 | Hiller et al. ................... 356/326 |

FOREIGN PATENT DOCUMENTS

| JP | 8-145794 | 6/1996 |
| JP | 2000-040813 | 2/2000 |
| JP | 2003-202463 | 7/2003 |
| JP | 2005-308495 | 11/2005 |

\* cited by examiner

*Primary Examiner* — Layla Lauchman
(74) *Attorney, Agent, or Firm* — Drinker Biddle & Reath LLP

(57) ABSTRACT

In a state that the body portion 4 is regulated by inner wall planes 27, 29, 28 of the package 3 so as not to move in parallel or perpendicularly with respect to the rear plane 4b, the spectroscopic module is directly supported by the package 3, thereby when the spectrometer is downsized, the spectroscopic module 2 can be supported securely and also there is provided securely a positional accuracy between the light incident opening 22a of the package 3, the spectroscopic portion 6 of the spectroscopic module 2 and the light detecting element 7. Further, the lead 23 is buried into the package 3 to give derivation and support by the lead deriving portion 26, thereby the lead deriving portion 26 in itself of the package 3 is allowed to act as a base when wire bonding is conducted to electrically connect the lead 23 with the light detecting element 7, thus preventing breakage and deviation of the spectroscopic module 2.

11 Claims, 9 Drawing Sheets

SPECTROMETER

TECHNICAL FIELD

The present invention relates to a spectrometer in which a spectroscopic module is accommodated inside a package.

BACKGROUND ART

The spectrometer is an optical device for decomposing light to be measured into individual spectral components by using a spectroscopic portion such as a prism and a diffraction grating (refer to Patent Document 1, for example). According to the above-described spectrometer, a light detecting element is used to detect spectral components of the light dispersed by the spectroscopic portion, thus making it possible to know the wavelength distribution of light, the intensity of a specific wavelength component and others.
Patent Document 1: Japanese Published Unexamined Patent Application No. H08-145794

DISCLOSURE OF THE INVENTION

Problems to be Solved by the Invention

In recent years, there has been developed a downsized spectrometer usable in various types of spectrometric devices and spectrometric systems. In the downsized spectrometer, it is necessary to arrange individual optical elements such as a light incident portion, a light detecting element and a spectroscopic portion at a high positional accuracy and also make a package compact. The thus arranged downsized spectrometer is able to make a photometric analysis instantly irrespective of a place where it is placed and, therefore, usable in environmental monitoring, confirmation of sugar content of fruit or the like, and color calibration of a printer or the like.

Thus, the spectrometer may be subjected to vibration or thermal load, depending on the use environment thereof, thereby individual optical elements are affected for positional accuracy. Where the spectrometer is poor in positional accuracy, target light is transmitted or reflected at a place where no light is needed to become stray light, thus resulting in a failure in obtaining accurate spectral characteristics. Therefore, the downsized spectrometer is, in particular, required to be highly reliable in order to cope with various use environments.

The above Patent Document 1 has disclosed a spectrometer which is provided with an optical bench on which various optical elements are mounted and a vessel into which the optical bench is accommodated. In this spectrometer, the optical bench is provided with an element attachment portion to which the optical elements are attached and a vessel fixture portion which is fixed to the vessel. The element attachment portion is constituted so as to cantilever the vessel fixture portion.

Where the spectrometer disclosed in the Patent Document 1 is downsized, there is made narrower a clearance between an inner wall plane of the vessel and various optical elements to be accommodated. Then, the element attachment portion is constituted so as to cantilever the vessel fixture portion. Therefore, when a spectrometer is subjected to vibration or thermal load, an optical element is brought into contact with the inner wall plane of the vessel and may be broken in some cases. Further, the optical element is poor in positional accuracy to cause stray light, by which it is impossible to obtain accurate spectral characteristics.

The present invention has been made in view of the above-described situation, an object of which is to provide a spectrometer which can be downsized, while keeping reliability, in particular, accurate spectral characteristics.

Means for Solving the Problem

In order to attain the above object, the spectrometer of the present invention is provided with a package having a light incident opening for making light incident thereinside and formed with a resin, a lead buried into the package, and a spectroscopic module accommodated into the package, in which the spectroscopic module is provided with a body portion for transmitting light made incident from the light incident opening, a spectroscopic portion for dispersing light transmitted from the body portion to reflect the light, and a light detecting element electrically connected to the lead to detect light dispersed and reflected by the spectroscopic portion, and the spectroscopic module is supported by the package in a state that the body portion is regulated by an inner wall of the package so as not to move to a predetermined direction.

In the spectrometer, the spectroscopic module is directly supported by the package in a state that the body portion is regulated by an inner wall of the package so as not to move to a predetermined direction. Therefore, where the spectrometer is to be downsized, the spectroscopic module can be securely supported, and the light incident opening of the package, the spectroscopic portion of the spectroscopic module and the light detecting element can also be sufficiently secured for mutual positional accuracy. Further, a lead is buried into the package. Thus, for example, where the lead is connected to the light detecting element by wire bonding or the like, the package in itself acts as a base, thus making it possible to prevent the spectroscopic module from breaking or deviating. As described so far, it is possible to downsize the spectrometer, while keeping reliability, in particular, accurate spectral characteristics.

Further, in the spectrometer of the present invention, it is preferable that the body portion includes a substrate having a predetermined plane and a lens portion provided between the predetermined plane and the spectroscopic portion, a stepped portion is provided on an inner wall plane of the package so as to enclose an outer edge of the predetermined plane, and the stepped portion regulates the substrate so as not to move in parallel or perpendicularly with respect to the predetermined plane. In this case, since such a constitution is made that the stepped portion provided on the inner wall plane of the package regulates the substrate so as not to move in parallel or perpendicularly with respect to the predetermined plane, the spectroscopic module is attached to the package, thus making it possible to support and position the spectroscopic module at the same time. Thereby, it is possible to efficiently conduct assembly work and also further improve the positional accuracy between components. In addition, being in parallel with respect to the predetermined plane means at least one direction which is approximately in parallel with respect to the predetermined plane, while being perpendicularly with respect to the predetermined plane means at least one direction approximately perpendicularly with respect to the predetermined plane.

Further, in the spectrometer of the present invention, it is preferable that the stepped portion has parts which are spaced away from the substrate in parallel with respect to a predetermined plane. In this case, assembly work can be conducted while the substrate is held between the spaced-away parts of the stepped portion, thus making it possible to improve the work efficiency.

In the spectrometer of the present invention, it is preferable that the body portion includes a substrate having a predetermined plane and a lens portion provided between the predetermined plane and the spectroscopic portion, a stepped portion is provided on an inner wall plane of a package so as to enclose an outer edge of the predetermined plane, the stepped portion regulates the substrate so as not to move perpendicularly with respect to the predetermined plane and also regulates the lens portion so as not to move in parallel with respect to the predetermined plane. In this case, such a constitution is made that the stepped portion provided on the inner wall plane of the package regulates the substrate so as not to move in parallel with respect to the predetermined plane and also regulates the lens portion so as not to move perpendicularly with respect to the predetermined plane. Therefore, the spectroscopic module is attached to the package, thus making it possible to support and position the spectroscopic module at the same time. Thereby, it is possible not only to conduct the assembly work efficiently but also to further improve the positional accuracy of individual components.

Further, in the spectrometer of the present invention, it is preferable that the package is formed by using a light blocking resin having light blocking and light absorbing properties. In this case, it is possible to securely prevent stray light from entering into the package without covering the surface of the package with a light blocking film or a light absorbing film.

Effect of the Invention

According to the present invention, a spectrometer can be downsized, while keeping reliability, in particular, accurate spectral characteristics.

DESCRIPTION OF REFERENCE NUMERALS

Figure 1:
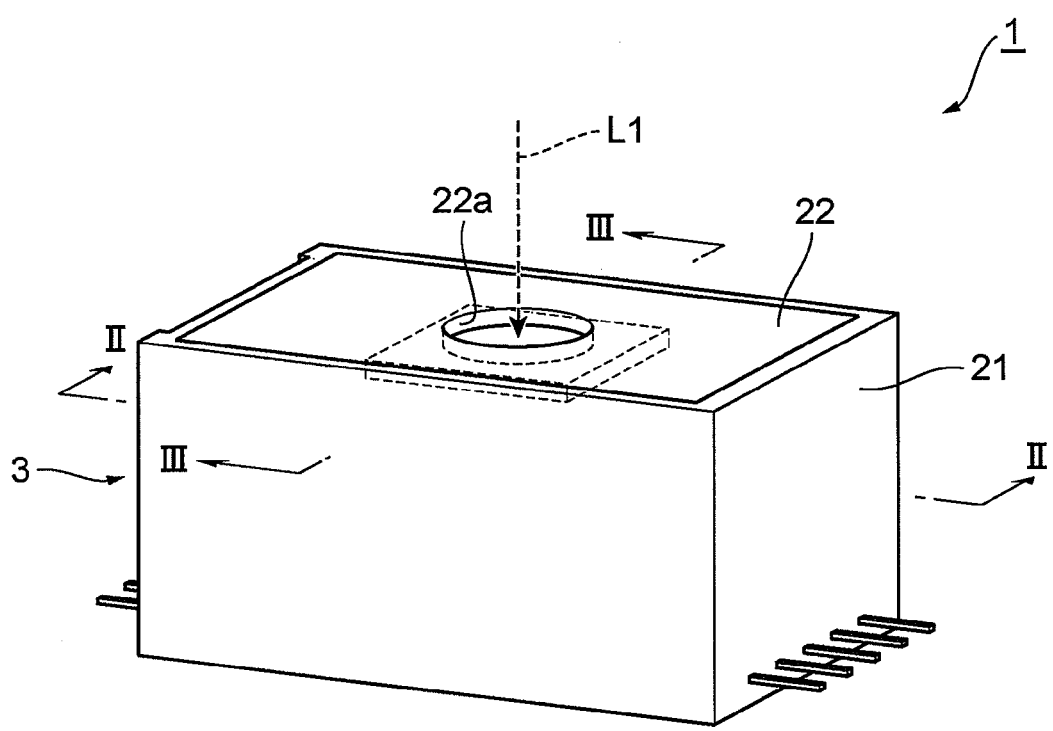
FIG. 1 is a perspective view of a spectrometer of an embodiment of the present invention.
Figure 2:
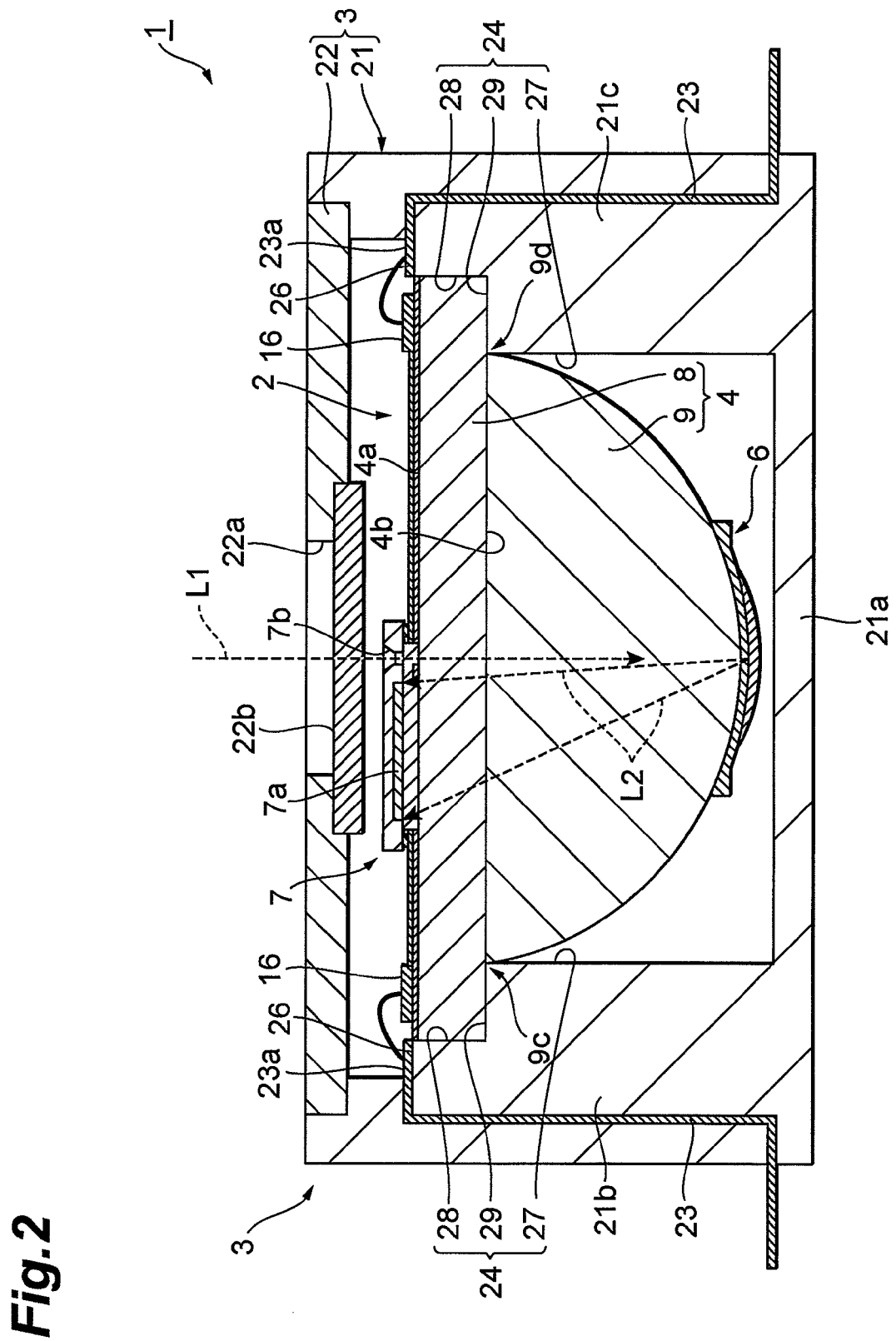
FIG. 2 is a cross sectional view of the spectrometer taken along line II to II in FIG. 1.
Figure 3:
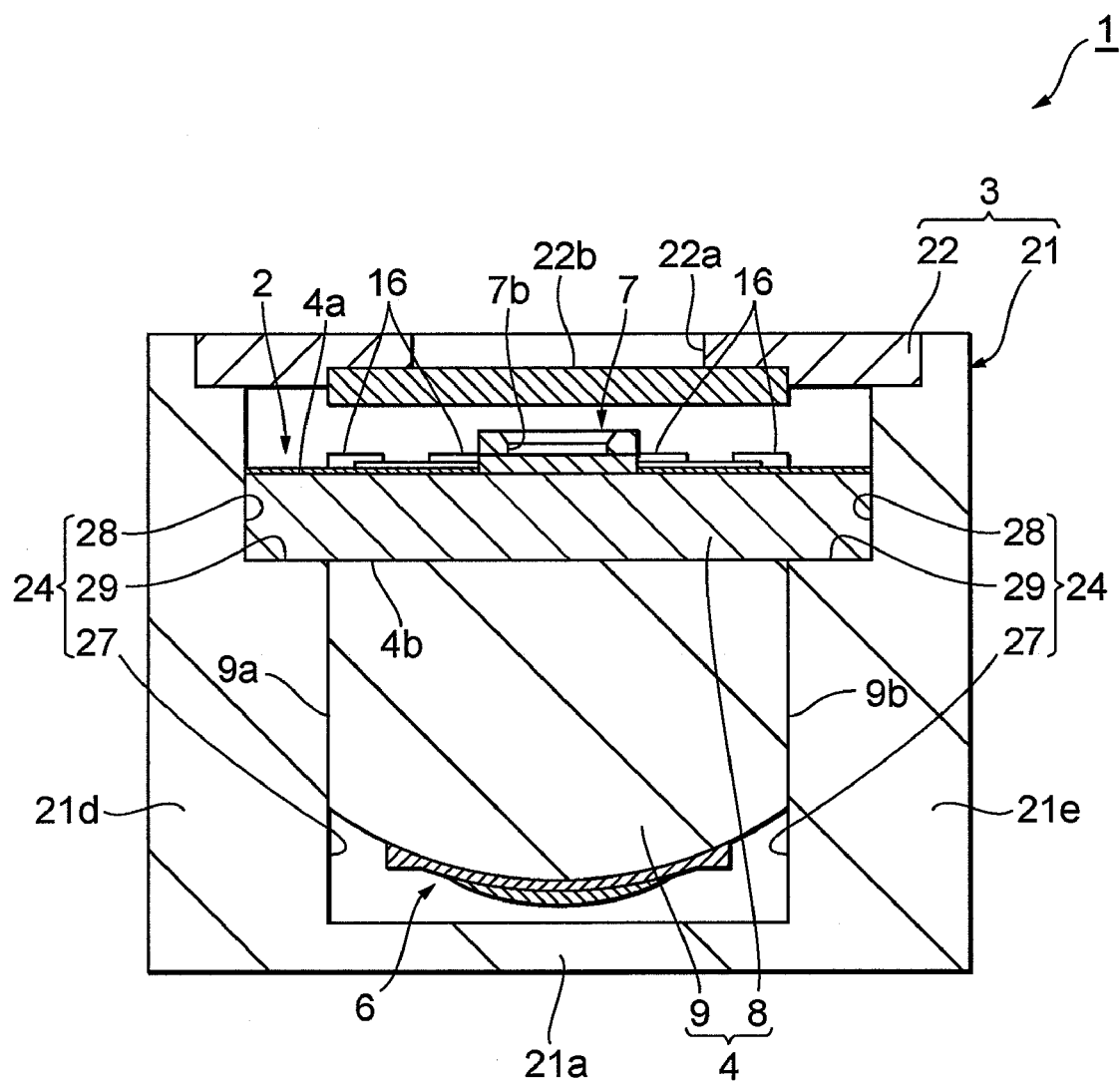
FIG. 3 is a cross sectional view of the spectrometer taken along line III to III in FIG. 1.

1: spectrometer
2: spectroscopic module
3: package
4: body portion
4b: rear plane (predetermined plane)
6: spectroscopic portion
7: light detecting element
8: substrate
9: lens portion
22a: light incident opening
23: lead
24: stepped portion
27, 28, 29: inner wall plane,
28a: groove (part spaced away from the substrate in parallel with respect to a predetermined plane)

BEST MODES FOR CARRYING OUT THE INVENTION

Hereinafter, a detailed description will be given for a preferred embodiment of the present invention by referring to the drawings. In addition, in individual drawings, the same reference letters or numerals are given to the same or corresponding parts, with overlapping description omitted. Further, in the present embodiment, a direction at which light L1 made incident into the spectrometer 1 advances is defined as "downward," and words representing directions such as "upper," "lower" and "horizontal" are to be used.

As shown in FIG. 1 to FIG. 4, the spectrometer 1 is an apparatus in which a spectroscopic module 2 accommodated inside a package 3 is used to disperse light L1 made incident from outside into the package 3, thereby spectra of the thus dispersed light L2 are detected and output.

The spectroscopic module 2 is provided with a body portion 4 for transmitting light L1, a spectroscopic portion 6 for dispersing the light L1 transmitted through the body portion 4 on a rear plane (predetermined plane) 4b side of the body portion 4 to reflect the light on a front plane 4a side, and a light detecting element 7 for detecting light L2 dispersed and reflected by the spectroscopic portion 6.

Figure 5:
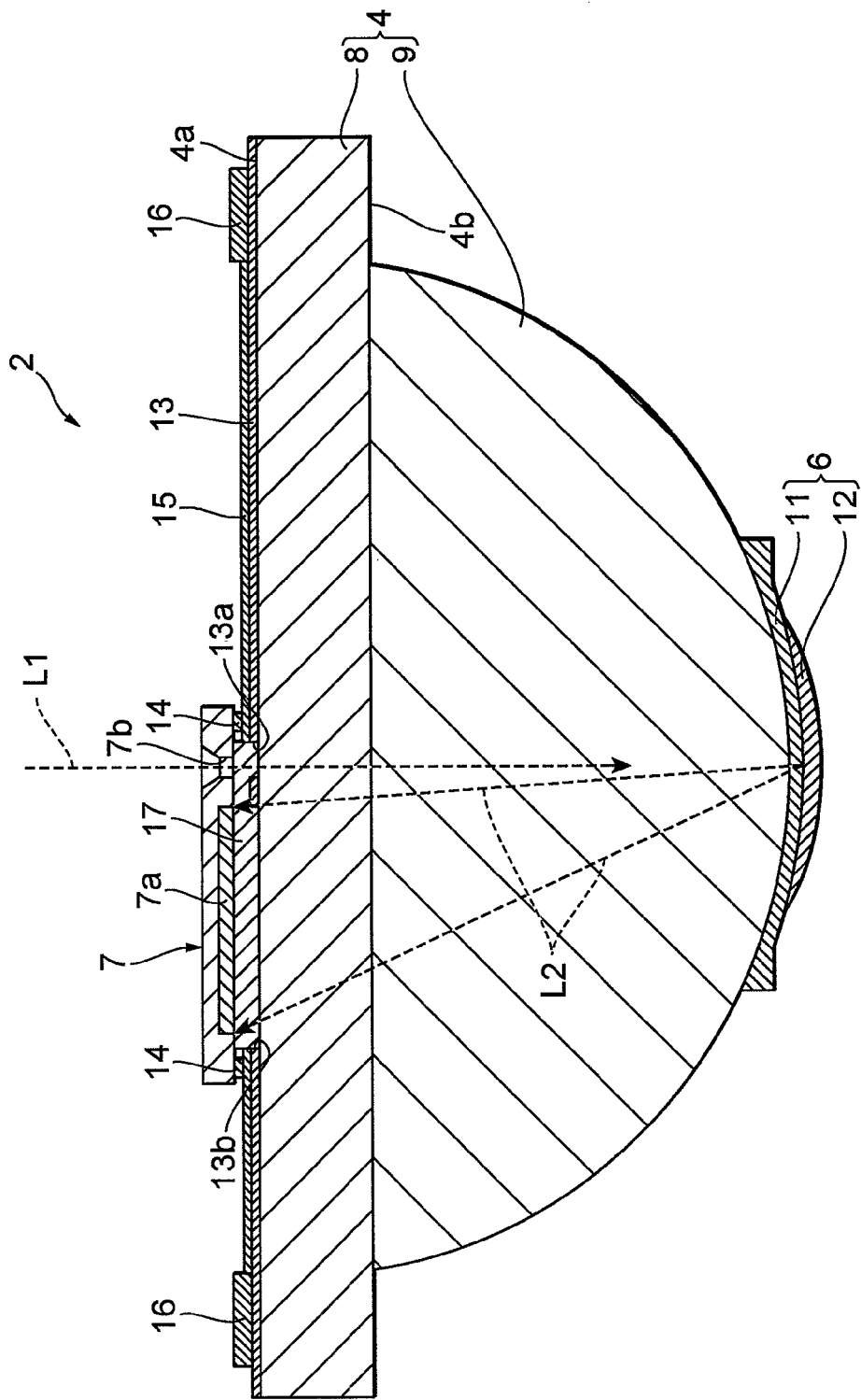
FIG. 5 is an enlarged cross sectional view of a spectroscopic module in FIG. 2.

As shown in FIG. 5, the body portion 4 is constituted with a substrate 8 formed in a rectangular plate shape by using light-transmitting glass such as BK7, Pyrex (registered trade mark) and quartz or a light-transmitting resin or the like and a lens portion 9 provided on the rear plane 4b of the substrate 8. The lens portion 9 is formed by using the same material as that of the substrate 8, that is, a light-transmitting organic-inorganic hybrid material, light-transmitting low-melting temperature glass for replica molding or the like, and acting as a lens for forming an image on a light detecting portion 7a of the light detecting element 7 on the basis of light L2 dispersed and reflected by the spectroscopic portion 6. The lens portion 9 is formed in such a shape that a hemispherical lens is cut out by two flat planes approximately orthogonal to the flat plane portion thereof and also approximately in parallel to each other to form side planes 9a, 9b. The above described shape is helpful in easily retaining the lens portion 9 on production and also capable of downsizing the spectroscopic module 2. The lens portion 9 is arranged in such a manner that the side planes 9a, 9b are approximately in parallel with respect to the longitudinal direction of the substrate 8 and bonded to the substrate 8 with an optical resin by direct bonding where it is made with the same material as that of the substrate 8.

The spectroscopic portion 6 is a reflection type grating having a diffracting layer 11 formed on the outer surface of the lens portion 9 and a reflecting layer 12 formed on the outer surface of the diffracting layer 11. The diffracting layer 11 is formed by installing together a plurality of grooves along the longitudinal direction of the substrate 8 (in the lateral direction on the sheet in FIG. 5), to which, for example, a serrated cross-sectional blazed grating, a rectangular cross-sectional binary grating, a sinusoidal cross-sectional holographic grating, or the like is applied. The diffracting layer 11 is formed, for example, by light-curing an optical resin for replica molding such as a light-curing epoxy resin, an acryl resin or an organic-inorganic hybrid resin. In addition, the diffracting layer 11 may be formed by shaping a heat-deformable light-transmitting resin or glass according to a thermal imprinting process. The reflecting layer 12 is formed in a film shape and formed by evaporating, for example, Al or Au, on the outer surface of the diffracting layer 11. Although not illustrated, a protective layer made up of $SiO_2$, $MgF_2$ or others may be laminated on the reflecting layer 12 by an evaporation process or the like, thus making it possible to keep the reflecting layer 12 stable.

The light detecting element 7 is provided with a light detecting portion 7a in which long photodiodes are arrayed one-dimensionally in a direction approximately orthogonal to the longitudinal direction thereof to detect light L2 dispersed and reflected by the spectroscopic portion 6 and a light passing hole 7b which is installed together with the light detecting portion 7a in a direction at which the photodiodes are arrayed one dimensionally and through which light L1 advancing to the spectroscopic portion 6 passes. The light passing hole 7b is a slit extending in the width direction of the substrate 8 and formed by etching or the like in a state that it is positioned at a high accuracy with respect to the light detecting portion 7a. The light detecting element 7 is arranged in such a manner that a direction at which the photodiodes are arrayed one dimensionally is approximately in agreement with the longitudinal direction of the substrate 8 and also the light detecting portion 7a turns to the front plane 2a of the substrate 8. In addition, the light detecting element 7 shall not be limited to the photodiode array but may include a C-MOS image sensor, a CCD image sensor or the like.

A light absorbing layer 13 is formed on the front plane 4a of the substrate 8. A slit 13a is formed on the light absorbing layer 13 at a position opposing the light passing hole 7b of the light detecting element 7 so that light L1 advancing to the spectroscopic portion 6 passes, and an opening portion 13b is formed at a position opposing the light detecting portion 7a so that light L2 advancing to the light detecting portion 7a of the light detecting element 7 passes. The light absorbing layer 13 is subjected to a predetermined shaped patterning and formed integrally with CrO, a CrO-containing laminated film, black resist or the like.

A plurality of substrate wirings 15 for sending input and output signals of the light detecting element 7 are formed on the surface of the light absorbing layer 13. One end of each of the substrate wirings 15 is connected to a bump 14 such as that coated with Au or others for fixing the light detecting element 7, while the other end thereof is connected to an electrode pad 16 for external input and output which is formed at both ends of the substrate 8. Although not illustrated, it is preferable that an insulating layer is formed between the substrate wiring 15 and the light absorbing layer 13. Further, the substrate wiring 15 may be positioned on a lower layer of the light absorbing layer 13. In this case, the light absorbing layer 13 at the electrode pad 16 is opened. The light detecting element 7 is subjected to face-down bonding by the bump 14 so that the light detecting portion 7a is opposed to the front plane 4a of the substrate 8 and loaded on the substrate 8. Further, an underfill material 17 is packed into a gap made between the substrate 8 and the light detecting element 7 by face-down bonding, thereby they are optically coupled.

Figure 4:
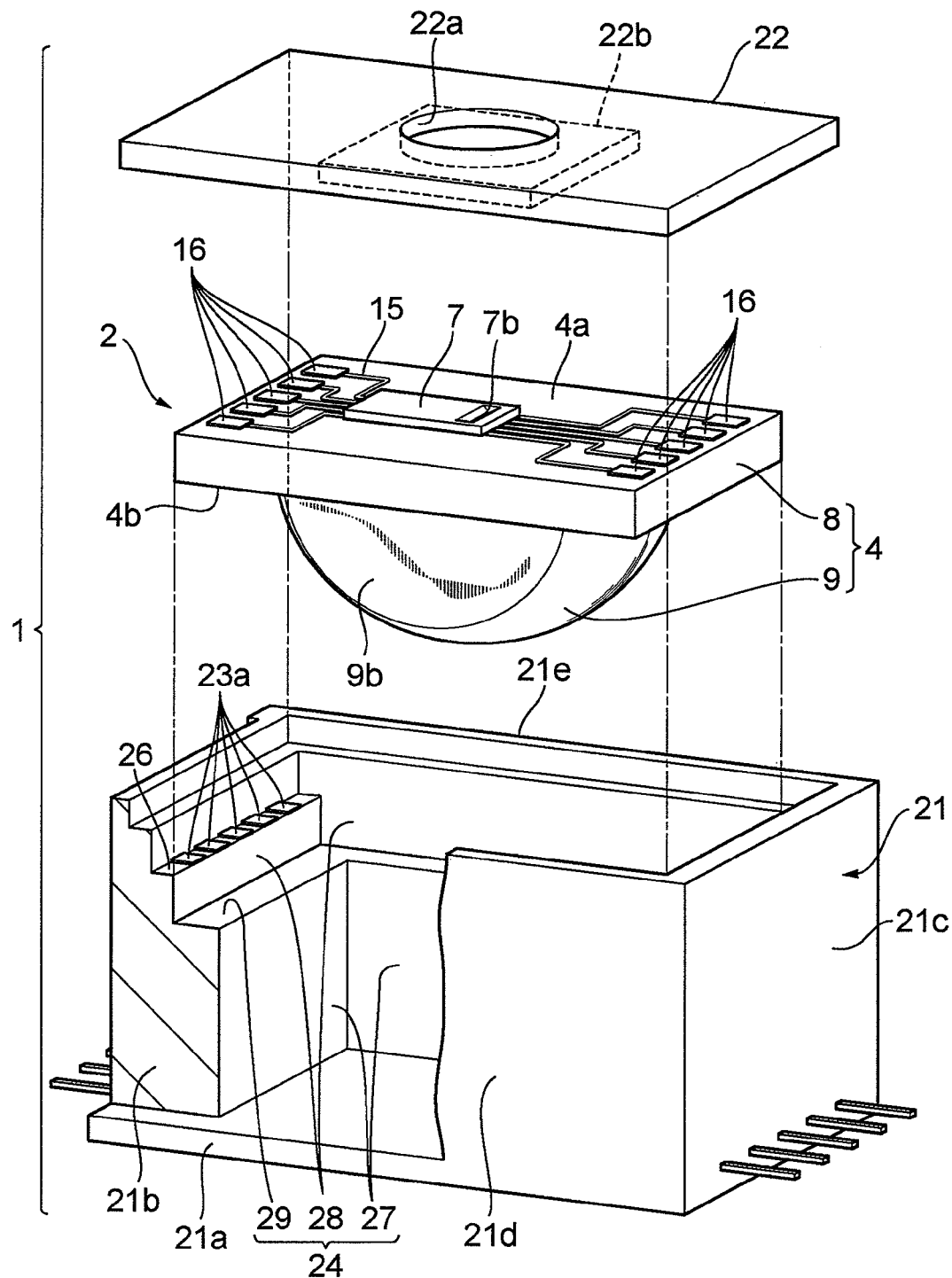
FIG. 4 is an exploded perspective view of the spectrometer in FIG. 1.

Reverting to FIG. 1 and FIG. 4, the above-described spectroscopic module 2 is accommodated into the package 3 so that the light detecting element 7 is positioned on the upper side and the spectroscopic portion 6 is positioned on the lower side. The package 3 acts to support the spectroscopic module 2 so as to regulate the body portion 4 not to move in parallel (a parallel direction of the predetermined plane) and perpendicularly (a perpendicular direction of the predetermined plane) with respect to the rear plane 4b and also to block light from outside. The package 3 is constituted with a rectangular-solid-shape box 21 opened on the upper plane and a lid 22 for sealing an opening portion of the upper plane of the box 21. In addition, the perpendicular direction is regulated only for a downward movement in the present embodiment. The package 3 is molded by using a light-transmitting resin and formed so as to block light from outside by coating a black resin or the like on the inner plane thereof. Further, it is more preferable that the package 3 is molded by using a light blocking or a light absorbing resin, for example, liquid-crystalline fully aromatic polyester resin, polycarbonate, polymethylmethacrylate or black epoxy. In this case, it is possible to reliably prevent stray light from entering into the package 3 without covering the surface of the package 3 by using a light-blocking film or a light absorbing film.

The lid 22 is attached to the upper end portion of the box 21 with a resin adhesive agent or by resin welding, supersonic welding and the like, thereby securely keeping the package 3 hermetic. The lid 22 is provided at the center with a light incident opening 22a opened so that light L1 passes through the light passing hole 7b of the light detecting element 7 of the spectroscopic module 2 and also a glass window 22b attached by resin adhesion so as to close the light incident opening 22a. In addition, the light L1 may be made incident directly from the light incident opening 22a or it may be made incident via an optical fiber by attaching a fiber insertion connector around the light incident opening 22a. Alternatively, in place of the glass window 22b, a lens may be attached to the light incident opening 22a.

The box 21 is formed by installing upright side wall portions 21b, 21c at both end portions of the rectangular plate-shaped bottom wall portion 21a in the longitudinal direction, installing upright side wall portions 21d, 21e at the both end portions in the width direction and burying a plurality of leads 23 into the side wall portions 21b, 21c by insert molding. A stepped portion 24 is provided on inner wall planes of these side wall portions 21b, 21c, 21d and 21e so as to enclose the entire periphery of the outer edge of the rear plane 4b of the substrate 8 in the spectroscopic module 2. Further, a lead deriving portion 26 is provided on the upper side from the stepped portion 24 on the inner wall planes of the side-wall portions 21b, 21c into which the leads 23 are buried.

The stepped portion 24 is to support the body portion 4 and also regulate it so as not to move in parallel and perpendicularly with respect to the rear plane 4b. It is constituted with inner wall planes 27 on four sides of the side wall portions 21b, 21c, 21d and 21e, inner wall planes 28 on four sides greater in the inner periphery than the inner wall planes 27 and formed on the upper sides of the inner wall planes 27, and an inner wall plane 29 spreading in the horizontal direction between the inner wall planes 27 and the inner wall planes 28 to form a seating plane. The inner wall planes 28 on the upper sides are in surface contact with the side walls on four sides of the substrate 8, thereby regulating the substrate 8 so as not to move in parallel, and formed so as to position the light incident opening 22a of the package 3 with respect to the spectroscopic module 2 by supporting the substrate 8. The inner wall plane 29 is in surface contact with outer edge portions on four sides of the rear plane 4b of the substrate 8, thereby regulating the substrate 8 so as not to move perpendicularly (in this case only for a downward movement), and arranged at such a height that the spectroscopic portion 6 is spaced away from the bottom wall portion 21a upon supporting the substrate 8. Further, the inner wall plane 27 on the lower sides are to regulate the lens portion 9 so as not to move in a horizontal direction, and formed so as to position the light incident opening 22a of the package 3 with respect to the spectroscopic module 2 upon supporting the lens portion 9. More specifically, the inner wall planes 27 at the side wall portions 21b, 21c opposing in the longitudinal direction of the substrate 8 are respectively in contact with the spherical edge portions 9c, 9d at parts where the lens portions 9 are in contact with the substrate 8 (refer to FIG. 2), and the inner wall planes 27 at the side wall portions 21d, 21e opposing in the width direction of the substrate 8 are in surface contact with the side planes 9a, 9b of the lens portion 9 (refer to FIG. 3).

The lead deriving portion 26 is constituted at the side wall portions 21b, 21c into which the leads 23 are buried with a horizontal inner plane wall formed by being given further a step to the upper side of the stepped portion 24, thereby deriving and supporting an upper end portion 23a of the thus buried lead 23. The lead deriving portions 26 are formed at the same height as the front plane 4a of the substrate 8 of the spectroscopic module 2.

The lead 23 extends vertically inside the side wall portions 21b, 21c, and the lower end side is bent outward and derived outside the package 3, while the upper end portion 23a side is bent inward and derived on the lead deriving portion 26 inside the package 3. Further, a plurality of the leads 23 are installed together in the width direction of the substrate 8. The upper end portion 23a of the lead 23 is supported by the lead deriving portion 26 and connected to the electrode pad 16 formed at both end portions of the substrate 8 by wire bonding.

A description will be given to the working effect of the above-described spectrometer 1.

In the spectrometer 1, the spectroscopic module 2 is directly supported by the package 3 in a state that the inner wall planes 27, 29, 28 of the package 3 regulate the body portion 4 so as not to move in parallel and perpendicularly with respect to the rear plane 4b. Therefore, where the spectrometer is to be downsized, the spectroscopic module 2 can be reliably supported, and the light incident opening 22a of the package 3, the spectroscopic portion 6 of the spectroscopic module 2 and the light detecting element 7 can also be sufficiently secured for mutual positional accuracy. Further, the leads 23 are buried into the package 3 to be derived and supported by the lead deriving portion 26. Thus, where the leads 23 are electrically connected to the light detecting element 7 by wire bonding, the lead deriving portion 26 of the package 3 acts in itself as a base, thus making it possible to prevent the spectroscopic module 2 from breaking or deviating or the like. As described so far, the spectrometer can be downsized, while keeping reliability, in particular, accurate spectral characteristics.

Further, since such a constitution is made that the stepped portions 24 provided by the inner wall planes 27, 28, 29 of the package 3 regulate the substrate 8 so as not to move in parallel and perpendicularly, it is possible to support and position the spectroscopic module 2 at the same time by attaching the spectroscopic module 2 to the package 3. Thereby, the assembly work can be conducted efficiently and also components can be further improved for mutual positional accuracy.

Still further, such a constitution is made that the stepped portions 24 provided by the inner wall planes 27, 28, 29 of the package 3 regulate the substrate 8 so as not to move perpendicularly and also regulate the lens portion 9 so as not to move in parallel. Therefore, the spectroscopic module 2 is attached to the package 3, thus making it possible to support and position the spectroscopic module 2 at the same time. Thereby, the assembly work can be conducted efficiently and also components can be further improved for mutual positional accuracy.

The present invention shall not be limited to the above-described embodiment.

Figure 6:
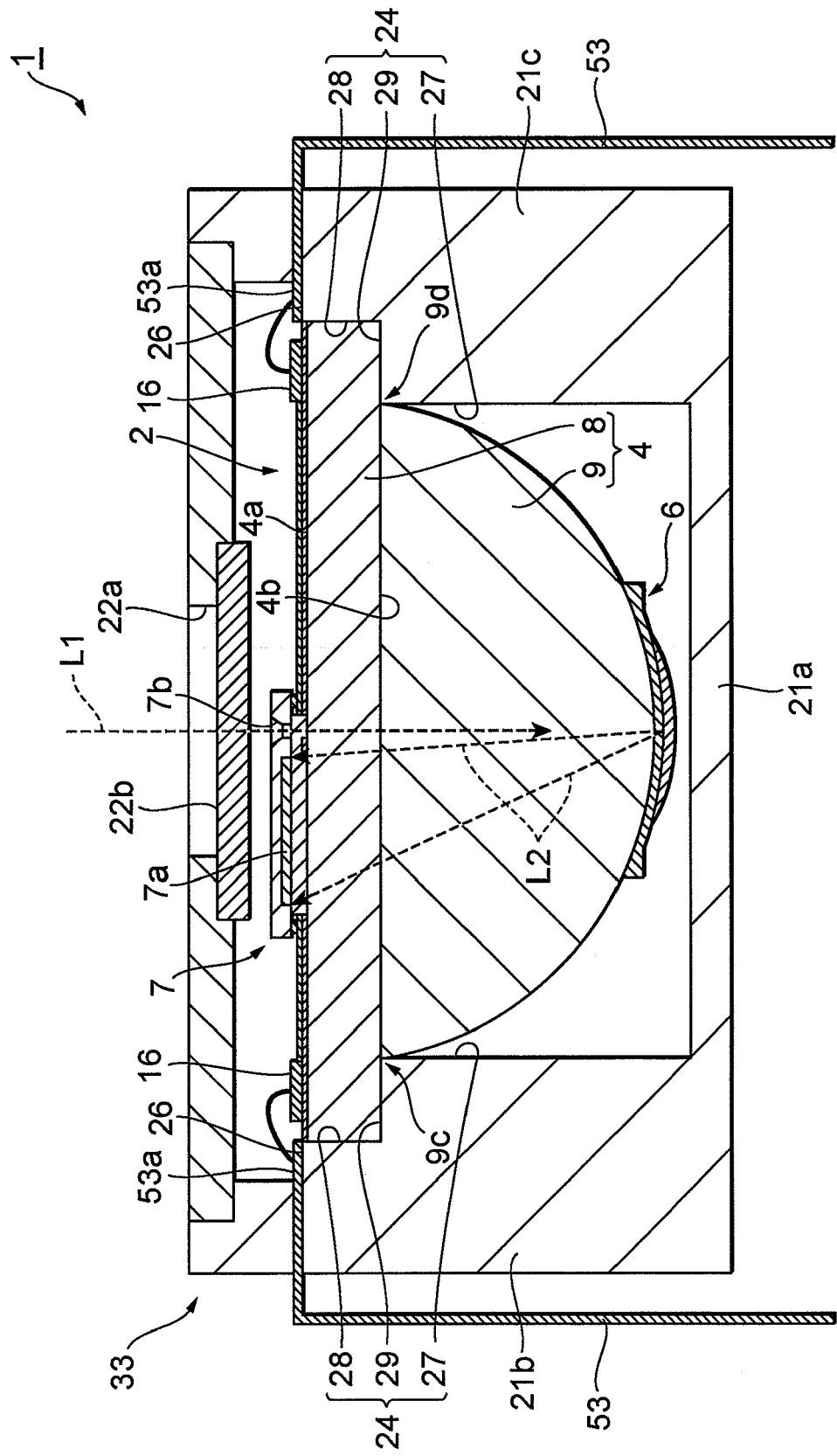
FIG. 6 is a cross sectional view of a spectrometer of another embodiment, which corresponds to the cross sectional view in FIG. 2.
Figure 7:
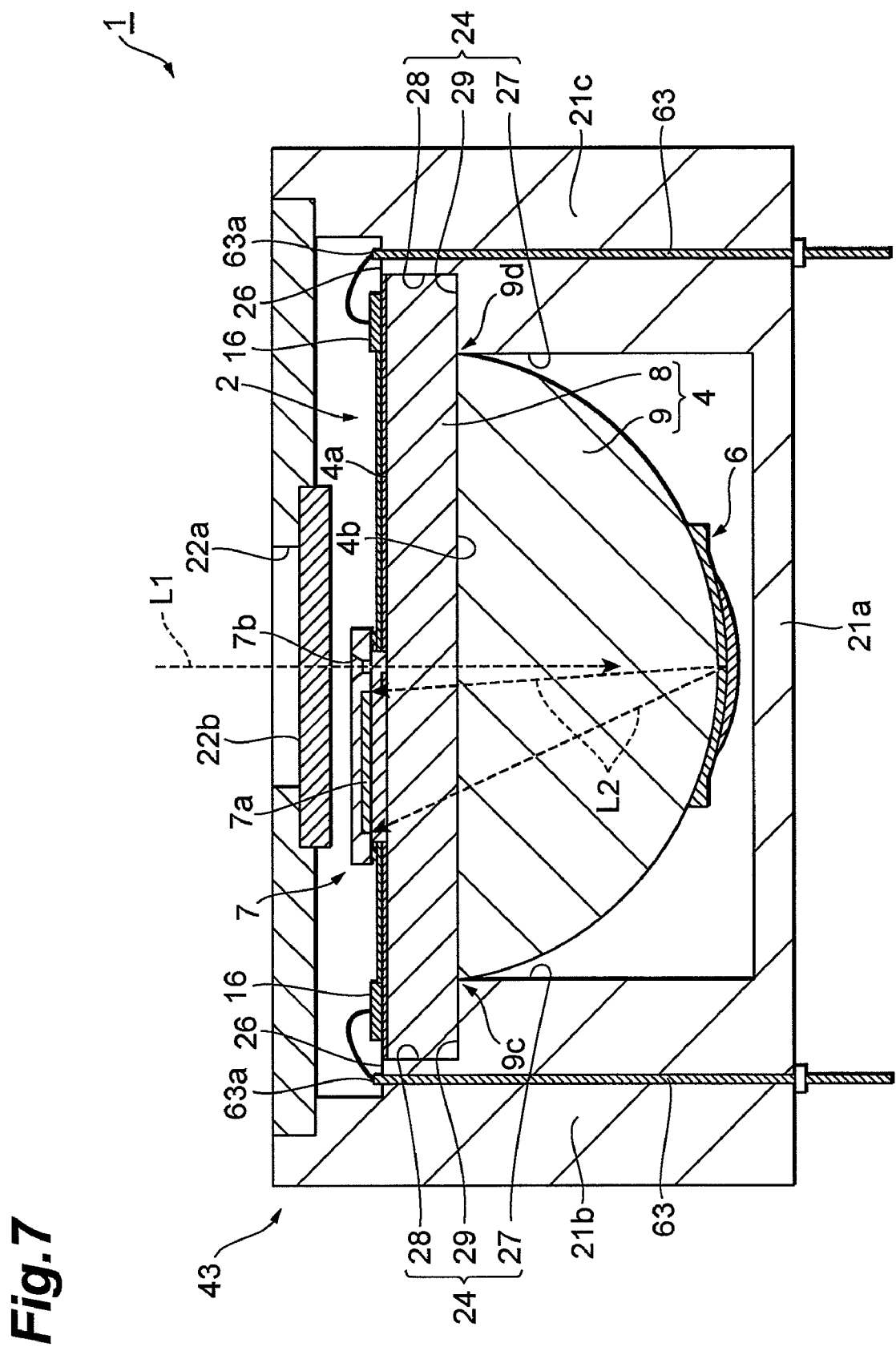
FIG. 7 is a cross sectional view of the spectrometer of another embodiment, which corresponds to the cross sectional view in FIG. 2.

For example, in the present embodiment, there is applied the package 3 formed according to insert molding by using the lead 23 in which the lower end side and the upper end side are bent. In addition to this, as shown in FIG. 6, there may be applied a package 33 formed according to insert molding by using a lead 53 in which only the upper end side is bent and the thus bent portion is buried. Still further, as shown in FIG. 7, a lead 63 may be pressed with pressure into a formed package 43 from the bottom wall portion.

Figure 8:
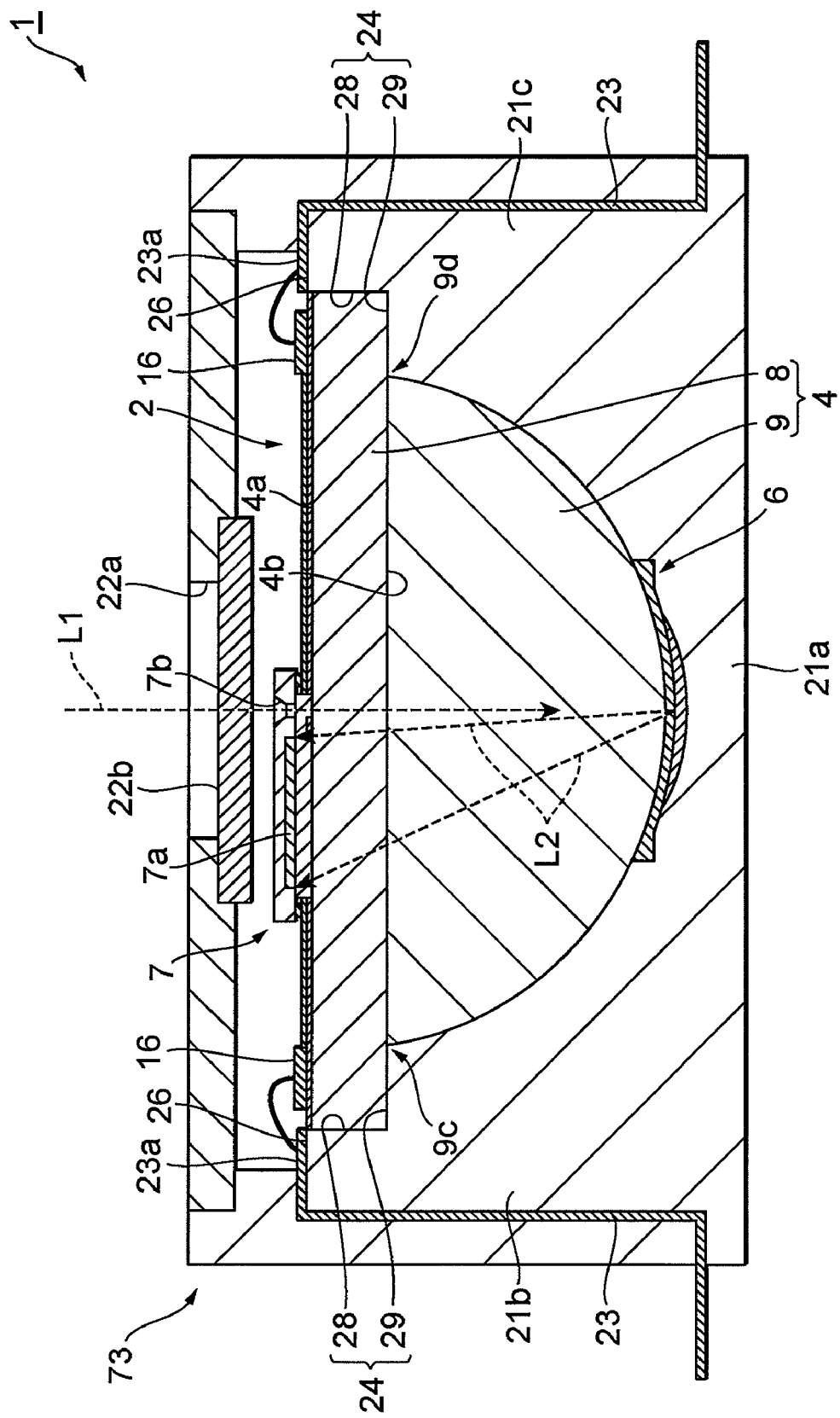
FIG. 8 is a cross sectional view of the spectrometer of another embodiment, which corresponds to the cross sectional view in FIG. 2.

Further, in the present embodiment, applied is the package 3 in which the bottom wall portion 21a and the side wall portions 21b, 21c, 21d, 21e are spaced away from the lens portion 9 and the spectroscopic portion 6. In addition to this, as shown in FIG. 8, there may be applied a package 73 capable of covering by resin all over the lens portion 9 and the spectroscopic portion 6. Alternatively, a light absorbing material may be filled into a space between the lens portion 9 and the spectroscopic portion 6 and a box.

Figure 9:
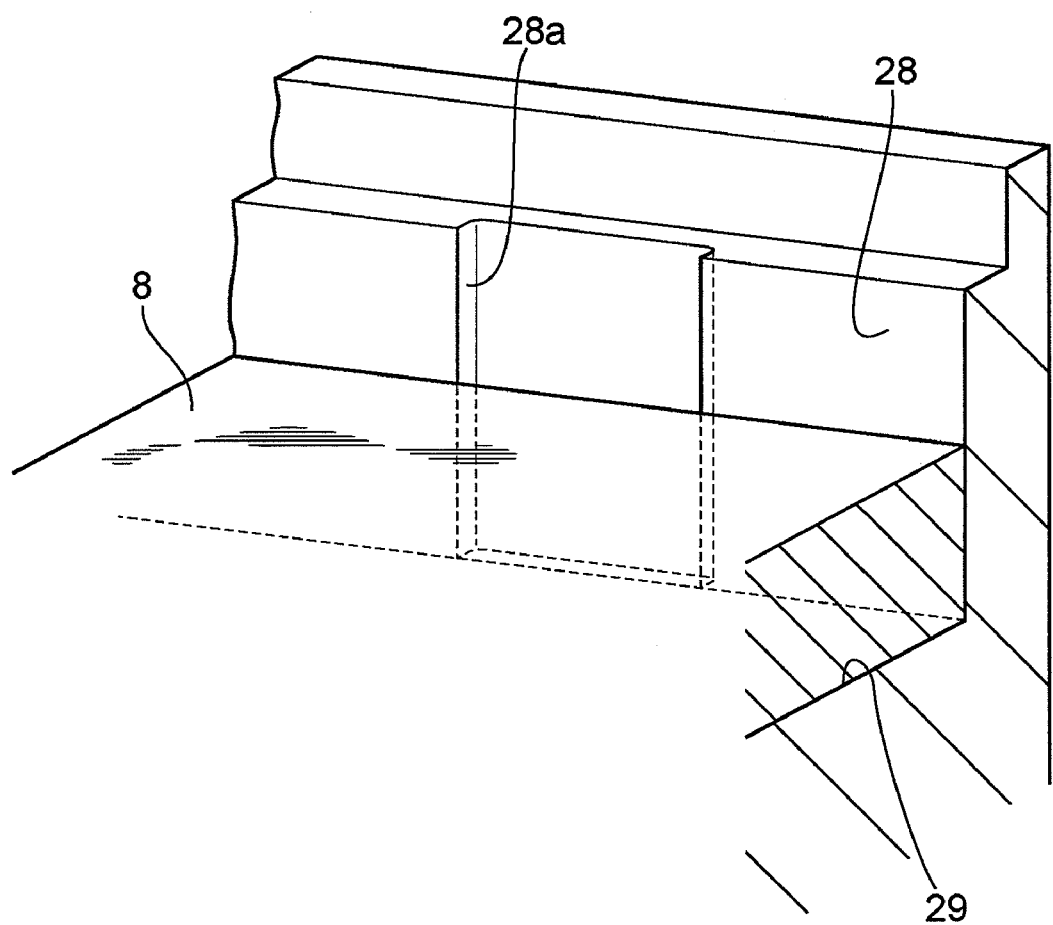
FIG. 9 is an enlarged view of a groove provided on an inner wall plane.

Further, in the present embodiment, the inner wall plane 28 of the stepped portion 24 gives support in surface contact with all the periphery of a side plane of the substrate 8. However, as shown in FIG. 9, a groove portion (a portion spaced away from the substrate in parallel with a predetermined plane) 28a is provided, by which it may be partially spaced away from the side plane of the substrate 8. Thereby, where the groove portions 28a is formed at mutually opposing positions, assembly work can be conducted by holding the substrate 8 between these positions of the groove portion 28a, thus making it possible to improve the work efficiency. Alternatively, such a constitution may be made that only one of a pair of opposing side wall portions 21b, 21c and a pair of opposing side wall portions 21d, 21e are used to support the substrate 8, while the inner wall planes 28 at the other pair of side wall portions are spaced away from the substrate 8.

Further, in the present embodiment, such a constitution is made that both the substrate 8 and the lens portion 9 are supported in parallel by the stepped portions 24. In place of this, such a constitution may be made that only one of the substrate 8 and the lens portion 9 is supported in parallel by the stepped portion 24, while the other is spaced away in parallel from the stepped portion 24.

Still further, in the present embodiment, such a constitution is made that the stepped portion 24 is formed over the entire periphery of the substrate 8. However, in place of this, such a constitution may be made that the stepped portion is provided discontinuously, thereby only a part of the substrate 8 is used to give a perpendicular support.

In addition, in the present embodiment, there is applied the light detecting element 7 having the light passing hole 7b. However, in place of this, a light detecting element free of the light passing hole may be applied, thereby allowing light L1 to directly pass through a slit 13a of the light absorbing layer 13.

Industrial Applicability

According to the present invention, the spectrometer can be downsized while keeping reliability, in particular, accurate spectral characteristics.

The invention claimed is:

1. A spectrometer comprising: a package having a light incident opening for making light thereinside and formed with a resin;
a lead buried into the package; and
a spectroscopic module accommodated into the package;
wherein the spectroscopic module comprises: a body portion for transmitting the light made incident from the light incident opening; a spectroscopic portion for dispersing the light transmitted through the body portion and reflecting the light; and a light detecting element electrically connected to the lead and for detecting the light dispersed and reflected by the spectroscopic portion;
the spectroscopic module is supported by the package in a state that the body portion is regulated by an inner wall plane of the package so as not to move to a predetermined direction;
the package includes a box opened on one side and a lid attached to an opening portion of the box and provided with light incident opening;
the spectroscopic module is accommodated into the package so that the light detecting element is positioned on the one side and the spectroscopic portion is positioned on the other side;
and the lid is opposed to a plane of the body portion, the plane on which the light detecting element is loaded.

2. The spectrometer as set forth in claim 1, wherein the body portion includes a substrate having a predetermined plane and a lens portion provided between the predetermined plane and the spectroscopic portion,
a step portion is provided on the inner wall plane of the package so as to enclose an outer edge of the predetermined plane,
and the step portion regulates the substrate so as not to move in parallel or perpendicularly with respect to the predetermined plane.

3. The spectrometer as set forth in claim 2, wherein the inner wall plane of the package is partially spaced away from a side plane of the substrate in the step portion.

4. The spectrometer as set forth in claim 1, wherein the body portion includes a substrate having a predetermined plane and a lens portion provided between the predetermined plane and the spectroscopic portion,
a step portion is provided on an inner wall plane of the package so as to enclose an outer edge of the predetermined plane,
and the step portion regulates the substrate so as not to move perpendicularly with respect to the predetermined plane and also regulates the lens portion so as not to move in parallel with respect to the predetermined plane.

5. The spectrometer as set forth in claim 1, wherein the package is formed with a light-blocking resin.

6. The spectrometer as set forth in claim 2, wherein the lens portion is bonded to the substrate.

7. The spectrometer as set forth in claim 4, wherein the lens portion is bonded to the substrate.

8. The spectrometer as set forth in claim 4, wherein the lens portion is formed in such a shape that a hemispherical lens is cut out by two flat planes approximately orthogonal to the flat plane portion thereof and also approximately in parallel to each other to form side planes,
and the inner wall plane of the package is in surface contact with each of the side planes of the lens portion.

9. The spectrometer as set forth in claim 1, wherein the spectroscopic portion has a diffracting layer formed on an outer surface of the body portion, a reflecting layer formed on an outer surface of the diffracting layer and a protective layer laminated on the reflecting layer.

10. The spectrometer as set forth in claim 1, wherein one end of the lead is derived inside the package and the other end of the lead is derived outside the package.

11. The spectrometer as set forth in claim 10, wherein the one end of the lead is supported by a lead deriving portion inside the package and connected to an electrode pad formed at both end portions of the substrate by wire bonding.

* * * * *